United States Patent [19]

Ishii et al.

[11] Patent Number: 4,471,195
[45] Date of Patent: Sep. 11, 1984

[54] FOOD RECEPTACLE FOR MICROWAVE OVENS

[75] Inventors: Kazunori Ishii; Takaaki Takamuku, both of Fuji, Japan

[73] Assignee: Tokyo Shibaura Denki Kabushiki Kaisha, Kanagawa, Japan

[21] Appl. No.: 542,897

[22] Filed: Oct. 18, 1983

Related U.S. Application Data

[62] Division of Ser. No. 287,644, Jul. 28, 1981, abandoned.

[30] Foreign Application Priority Data

Aug. 7, 1980 [JP] Japan .............................. 55-108446

[51] Int. Cl.³ .............................................. H05B 6/78
[52] U.S. Cl. ...................... 219/10.55 E; 219/10.55 F; 219/10.55 B; 219/518; 99/451; 99/DIG. 14
[58] Field of Search ............... 219/10.55 F, 10.55 R, 219/10.55 E, 10.55 D, 10.55 M, 10.55 B, 10.55 A, 389, 518; 366/219, 220, 231; 34/1, 108, 121; 99/421 H, 451, DIG. 14

[56] References Cited

U.S. PATENT DOCUMENTS

| | | | |
|---|---|---|---|
| 3,276,138 | 10/1966 | Fritz | 219/10.55 R |
| 3,300,615 | 1/1967 | Smith | 219/10.55 F |
| 3,333,088 | 7/1967 | Verbeek | 34/1 X |
| 3,410,116 | 12/1968 | Levinson | 219/10.55 R X |
| 3,428,772 | 2/1969 | Wallenfels | 219/10.55 F |
| 3,777,095 | 12/1973 | Muranaka | 219/10.55 A |
| 3,777,099 | 12/1973 | Levinson | 219/10.55 E |
| 3,807,292 | 4/1974 | Cinger | 366/220 X |
| 3,854,021 | 12/1974 | Moore et al. | 219/10.55 F |
| 3,934,106 | 1/1976 | MacMaster et al. | 219/10.55 E |
| 3,981,488 | 9/1976 | Ratowsky | 366/219 |
| 4,217,477 | 8/1980 | Matsubara et al. | 219/10.55 E |
| 4,308,445 | 12/1981 | Offutt | 219/10.55 F |
| 4,334,136 | 6/1982 | Mahan et al. | 219/10.55 R |
| 4,356,640 | 11/1982 | Tansson | 34/10.55 R |

FOREIGN PATENT DOCUMENTS

| | | |
|---|---|---|
| 120362 | 7/1930 | Fed. Rep. of Germany . |
| 2411664 | 9/1975 | Fed. Rep. of Germany . |
| 2705063 | 8/1978 | Fed. Rep. of Germany . |
| 48-20115 | 6/1973 | Japan . |
| 1110052 | 4/1968 | United Kingdom . |
| 1235865 | 6/1971 | United Kingdom . |
| 1304683 | 1/1973 | United Kingdom . |
| 1439260 | 6/1976 | United Kingdom . |
| 1462614 | 1/1977 | United Kingdom . |

Primary Examiner—Roy N. Envall, Jr.
Assistant Examiner—Philip H. Leung
Attorney, Agent, or Firm—Cushman, Darby & Cushman

[57] ABSTRACT

A rotary receptacle for use in a microwave oven includes a plastic housing, in which food may be inserted, with projections therein to mix the food within the housing as the receptacle turns. The axes of the receptacle, which are connected to the driving mechanism, may be offset from the longitudinal axis of the housing to produce a tumbling effect. The housing may be made of transparent plastic. Alternately it may be constructed of an open wire mesh.

13 Claims, 15 Drawing Figures

FOOD RECEPTACLE FOR MICROWAVE OVENS

This is a division, of application Ser. No. 287,644, filed July 28, 1981, now abandoned.

BACKGROUND OF THE INVENTION

This invention relates to microwave ovens provided with rotary receptacles therein.

With the spread of microwave ovens, rotary equipment for cooking various foods have been used increasingly. As a typical example of such rotary equipment, a rotisserie arrangement may include a spit supported by the sidewalls and actuated by a chain connected to a motor. However, the rotary equipment of this type can be used only with certain types of food which are conducive to being skewered, such as chicken.

Accordingly, the object of this invention is to provide a rotary receptacle in an oven for cooking the various foods which cannot be skewered.

The present invention is a rotary receptacle for use in a microwave oven including a plastic housing in which food may be inserted, with projections therein to mix the food within the housing as the receptacle turns. The axes of the receptacle, which are connected to the driving mechanism, may be offset from the longitudinal axis of the housing to produce a tumbling effect. The housing may be made of transparent plastic. Alternatively it may be constructed of an open wire mesh.

The receptacle may be rotated either at one of several constant speeds or intermittently. With the wire mesh housing a switch may be provided to disable the microwave generator when the wire mesh housing is inserted. In fact, the support axes of the wire mesh and clear plastic housings may be made differently so that the microwave generator will be disabled only when the wire mesh housing is employed.

This invention can be more fully understood from the following detailed description when taken in conjunction with the accompanying drawings, in which:

FIGS. 1 to 6 show an embodiment of this invention, in which:

FIG. 1 is an elevational view when the door of the microwave oven is opened;

FIG. 2 is a longitudinal sectional view of the microwave oven;

FIG. 3 is a radial sectional view of a rotary receptacle;

FIG. 4 is a wiring diagram of a control circuit used in the microwave oven shown in FIG. 1;

FIG. 5 is an alternate control circuit wiring diagram used in the microwave oven shown in FIG. 1;

FIG. 6 is an expanded sectional view when the rotary receptacle is set in an oven;

Now there will be described the preferred embodiment of this invention with reference to the accompanying drawings.

Figure 1:
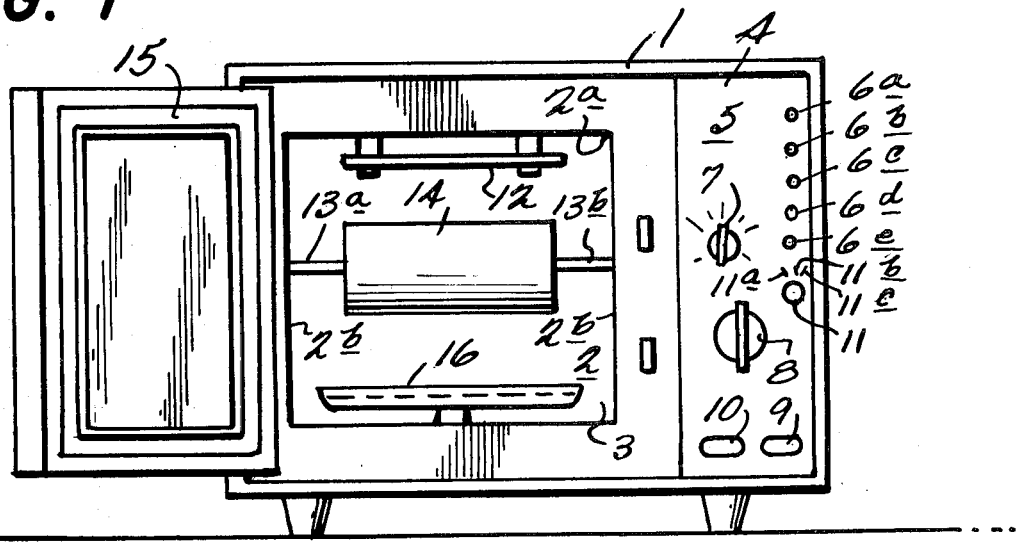

Referring now to FIG. 1, the microwave oven includes a housing 1 which has a double wall structure, with the inner walls made of steel plate defining an oven 2. An opening 3 is provided at the front of oven 2, which opening 3 may be closed by door 15. Housing 1 further includes an outside front wall portion 4 immediately beside opening 3. A control panel 5 is mounted on front wall portion 4, and includes power select button 6a–6e, a thermal control button 7, a timer switch 8, a power switch button 9, a cooking switch button 10 and a revolutional velocity changing switch 11. Revolutional velocity changing switch 11 has an off position 11c, a fast position 11a and a slow position 11b. A resistive heating element 12 is mounted just below top wall 2a of oven 2. Rotating axes 13a, 13b are mounted in vertical side walls 2b of oven 2 and a rotary receptacle 14, in which food is disposed, is supported by rotating axes 13a, 13b.

Figure 2:
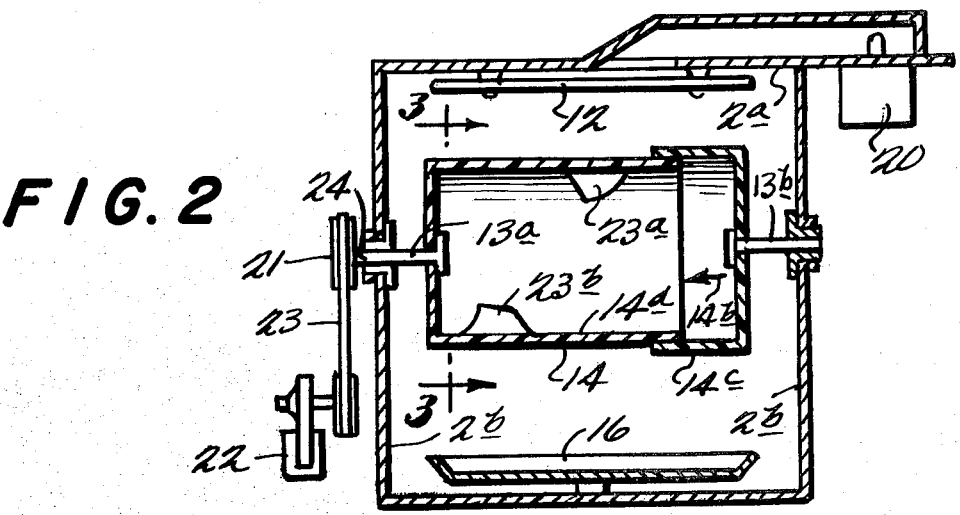

Referring now to FIG. 2, a microwave generator 20 is installed on top wall 2a of oven 2. And rotating axes 13a, 13b are supported on the vertical side walls 2b in alignment with rotary receptacle 14. Further, rotating axis 13a extends through vertical side wall 2b and has a pulley 21 disposed on end 24 thereof. Pulley 21 is connected to a motor 22 by a belt 23. Rotating axes 13a, 13b are actuated by motor 22.

Figure 3:
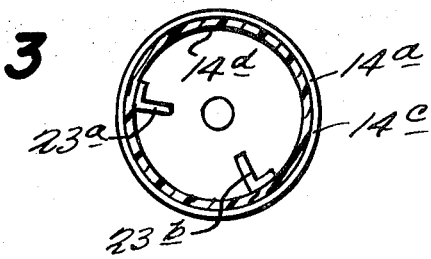

As illustrated in FIG. 3, rotary receptacle 14 comprises a receptacle body 14a, having an opening 14b (see also FIG. 2) and a cover 14c fitted to opening 14b. Body 14a and cover 14c are formed of a transparent material. Further, two projections 23a, 23b are attached on inside walls 14d of receptacle 14 for agitating objects in receptacle 14.

Figure 4:
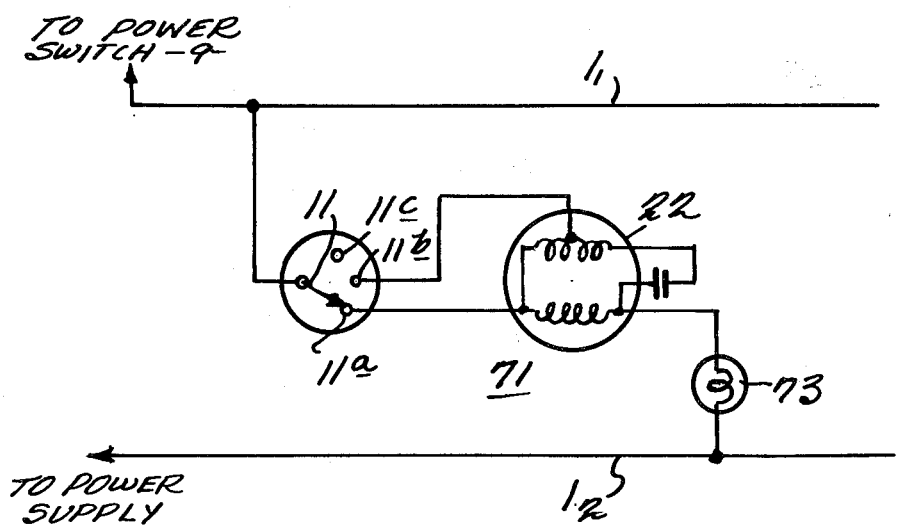

FIG. 4 shows a wiring diagram of a control circuit 71 used in changing the revolutional velocity of motor 22. In the circuit diagram, line $l_1$ is connected in series with power switch 9 so that power is applied to line $l_1$ when switch 9 is closed. Obviously, if it is desired that motor 22 be energized only when resistive heating is being employed, control circuit 71 can be connected in parallel with resistive heating element 12. Line $l_2$ is connected to the other terminal of the power supply. Motor 22 is connected in series with revolutional velocity changing switch 11, and a rotating operation lamp 73 between lines $l_1$ and $l_2$. Switch 11 has three positions as described above. In position 11a motor 22 rotates at high speed, in position 11b motor 22 rotates at low speed and in position 11c motor 22 is not energized.

Figure 5:
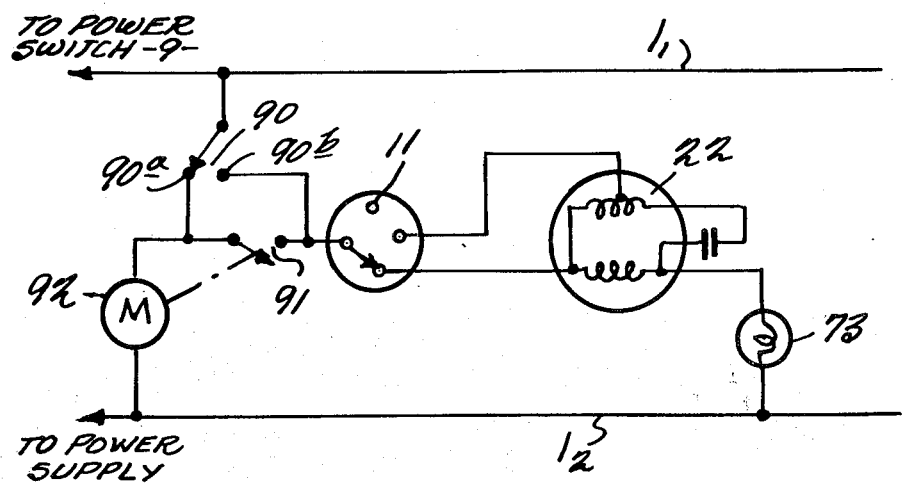

It is sometimes desirable to cause motor 22 to rotate intermittently. In FIG. 5, switch 90 is provided to enable a selection between continuous operation (when switch 90 is in position 90b) and intermittent operation (when switch 90 is in position 90a). To enable intermittent operation, timer motor 92 is connected between switch terminal 90a and line $l_2$ and controls switch 91. When switch 90 is in position 90a, motor 92 rotates, periodically opening and closing switch 91. Since a second terminal of switch 91 is connected to motor 22 through velocity changing switch 11, motor 22 will rotate intermittently. FIG. 5 illustrates a separate timer motor 92 to operate switch 91. As is well known in the art microwave ovens typically includes several timer motors. One of these other timer motors may be employed to operate switch 91.

The operation of the microwave oven thus constructed will be described with reference to FIG. 1 to FIG. 5. An operator disposes food in receptacle body 14a, and fits cover 14c to opening 14b of receptable body 14a. Door 15 is closed and the desired cooking time is set on timer 8. Then the operator selects the mode of cooking with switches 6a–6e and if resistive heating is selected with switch 6e, thermostat control 7 must be set. Then the operator selects the appropriate speed for motor 22 with switch 11. Finally, power switch 9 and cooking switch 10 are closed. Thus the selected heating source is energized and food in rotary receptacle 14 is heated. Also rotary receptacle 14 rotates because motor 22 is energized.

As inside walls 14d of rotary receptacle 14 have two projections 23a, 23b, they agitate the food effectively. Since rotary receptacle 14 is transparent, the operator can see the food as it cooks.

With the microwave oven according to the invention, rotary receptacle 14 rotates, and the food therein is heated uniformly and many kinds of food can be cooked and mixed together. Thus a variety of vegetables, for example, can be mixed in receptacle 14 and heated uniformly. Seasoning can also be included and will be evenly distributed throughout. In the above embodiment, drippings from the food, such as oil, do not drop from rotary receptacle 14 because cover 14c fits closely on receptacle body 14a. The rotary receptacle, according to the invention as shown in FIG. 2 and FIG. 3, is cylindrical. However, it can be either triangular or rectangular.

Figure 6:
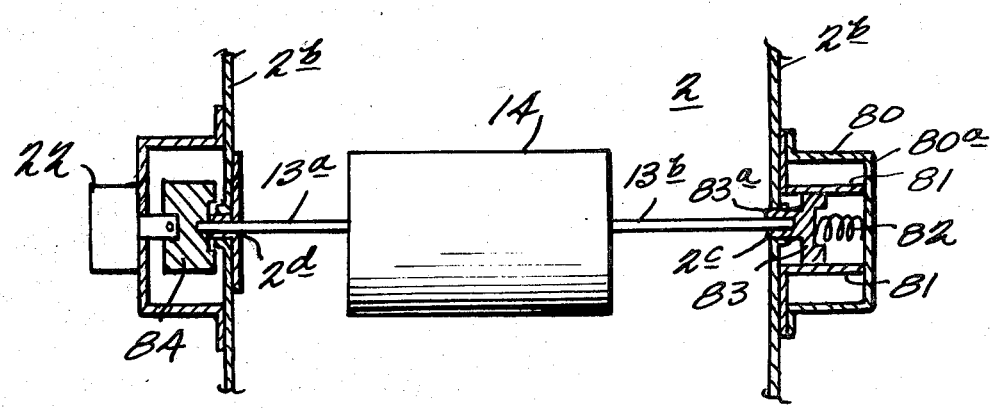

FIG. 6 shows an expanded sectional view with rotary receptacle 14 set in oven 2. Numeral 80 designates a bearing device generally in which guiding plate 81 is provided. Compression spring 82 biases bearing block 83 away from wall 80a of bearing device 80. Axial projection 83a of bearing block 83 projects through an opening 2c of vertical side wall 2b. Rotating axis 13b is mounted in projection 83a and both elements can rotate with respect to wall 2b. The opposite rotating axis 13a extends into coupling block 84 through opening 2d and is connected to motor 22 either directly as illustrated in FIG. 6 or through belt 23 as illustrated in FIG. 2.

Figure 7:
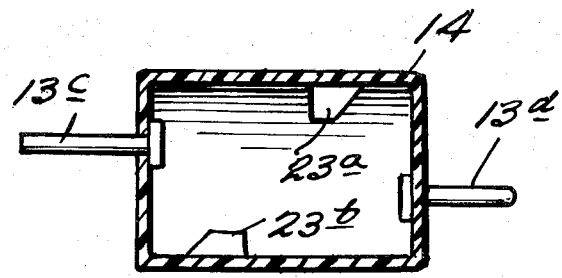
FIG. 7 is a longitudinal sectional view of an embodiment of this invention with offset axis.
Figure 8:
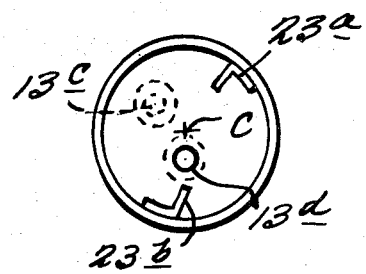
FIG. 8 is a schematic end view of the embodiment in FIG. 7.

FIGS. 7 and 8 show an alternate embodiment for agitating food. In FIGS. 7 and 8, rotary receptacle 14 has eccentric rotating axes 13c, 13d which are parallel to and offset from the longitudinal axis of rotary receptacle 14. When eccentric axes 13c and 13d are employed, it is necessary to provide sufficient clearance in bearing block 83 and coupling block 84 (see FIG. 6).

Figure 9:
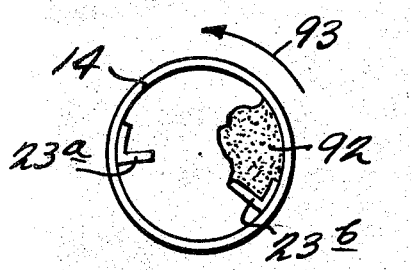
FIGS. 9 and 10 are schematic illustrations of the action of this invention.
Figure 10:
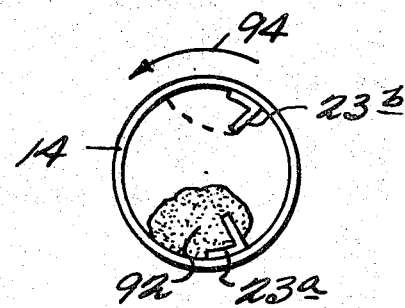

FIGS. 9 and 10 illustrate projections 23a, 23b in receptacle 14 for agitating food 92. If the rotary receptacle 14 rotates in the direction of arrow 93, food 92 is lifted by projection 23b.

When rotary receptacle 14 rotates to the position shown in FIG. 10, food 92 falls from projection 23b to a position near projection 23a.

Figure 11:
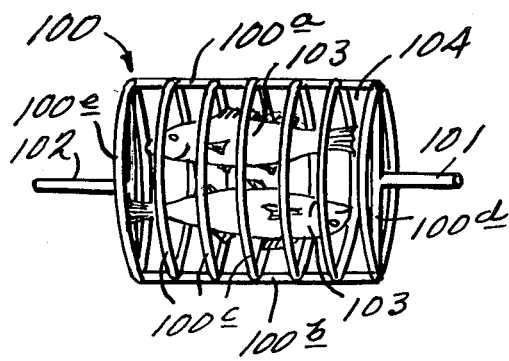
FIGS. 11 and 12 are perspective views of other embodiments of this invention.

In FIG. 11, rotary receptacle 100 includes two wires 100a, 100b that are located symmetric to the center of receptacle 100 and many elliptical wires 100c welded to wires 100a, 100b. Also side wires 100d, 100e are welded in the center of two sides of rotary receptacle 100. Rotating axes 101, 102 are welded to side wires, 100d, 100e. In this construction, food 103 is placed in receptacle 100 through openings 104 of wire receptacle 100.

Figure 12:
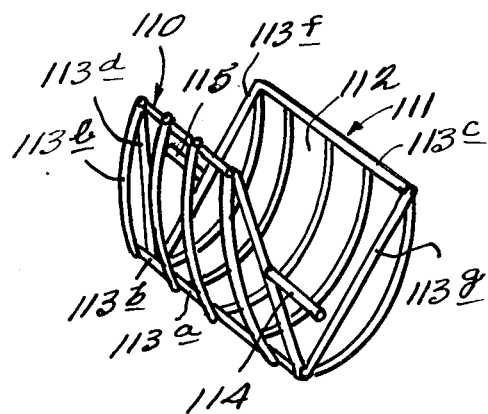
Figure 13:
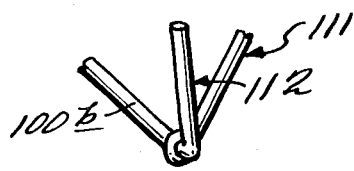
FIG. 13 is a blowup perspective of a portion of FIG. 12.
Figure 14:
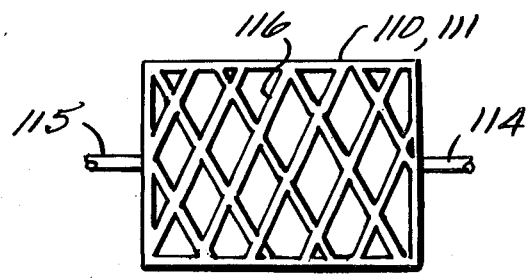
FIG. 14 is a side elevational view of another embodiment of this invention.

FIG. 12 to FIG. 14 illustrate alternative constructions of the embodiment in FIG. 11. In FIGS. 12 and 13, the receptacle includes two halves 110, 111 which may be separated to create opening 112 through which food may be inserted. Half 111 is hinged to wire 113a of half 112 (See FIG. 13). Each half 111 and 112 includes a plurality of parallel wires 113b welded to top wires 113c. The lower ends of wires 113b of half 110 are welded to wire 113a, and the lower ends of wires 113b of half 111 are bent around wire 113a to form the hinge. Half 110 includes straight wires 113d and 113e welded between wires 113c and 113a. Similarly, half 111 includes straight wires 113f and 113g. Rotating axes 114 and 115 are welded to wires 113e and 113f, respectively. It is advantageous to have axes 114 and 115 welded to opposite halves, to assist in maintaining halves 110 and 112 closed when the receptacle is mounted in the oven.

Instead of having wires 113b parallel as in FIG. 12, FIG. 14 shows another embodiment with wires 116 of halves 110, 111 forming a rhomboidal pattern. This pattern is not only aesthetically pleasing, but also assists in maintaining food in the receptacle.

Figure 15:
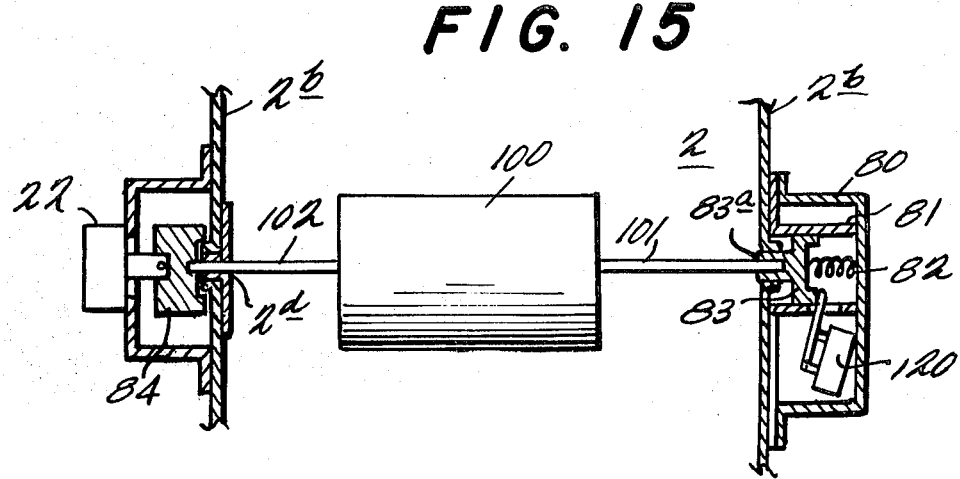
FIG. 15 is a schematic view of the portion of a microwave oven containing the present invention.

FIG. 15 shows a scheme for disabling microwave generator 20 when receptacle 100 is made of electrically conductive wire, such as metal. It is necessary to disable microwave generator 20 because conductive receptacle 100 would cause sparks between the walls of oven 2 and receptacle 100. In FIG. 15, micro-switch 120 is disposed within bearing assembly 80 and is activated by the position of bearing block 83. When conductive receptacle 100 is set in position, bearing block 83 is pushed against spring 82 to open. Micro-switch 120 is connected in series with the power supply for microwave generator 20 so that when the switch is open, no power is applied to generator 20. When switch 120 is closed power can be applied to generator 20.

Axes 101 and 102 of conductive receptacle 100 may be made longer than the axes of a non-conductive receptacle so that the non-conductive receptacle does not open switch 120, but conductive receptacle 100 does.

What is claimed is:

1. A microwave oven for cooking food comprising:
   an oven for heating said food, said oven having first and second oppositely disposed walls;
   means for generating microwaves in said oven;
   means for providing non-microwave cooking energy in said oven;
   receptacle means, rotatably and removably supported by said first and second walls and including a body for containing said food and shafts removably supported by said first and second walls, said receptacle means for receiving said food;
   means for rotating said shafts; and
   means responsive to the presence of said shafts in said first and second walls, for disabling said microwave generating means whenever said receptacle means is disposed in said oven.

2. A microwave oven according to claim 1, wherein said receptacle means comprises a receptacle body defining an opening and a cover fitting said opening.

3. A microwave oven according to claim 1, wherein said rotating means includes means for selectively rotating said receptacle means continuously and intermittently.

4. A microwave oven according to claim 1, wherein said receptacle means further comprises at least one projection disposed within said receptacle for agitating said object food.

5. A microwave oven according to claim 4, comprising two said projections, said projections being disposed at different positions with respect to a longitudinal axis of said receptacle means.

6. A microwave oven according to claim 1, wherein said receptacle means rotate about an eccentric axis.

7. A microwave oven according to claim 1, wherein said body of said receptacle means comprises a wire cage.

8. Apparatus as in claim 7 wherein said wire cage includes two pivotally interconnected halves.

9. A microwave oven as in claim 7 wherein said wire cage includes wires forming said body shaped in a rhomboidal pattern.

10. A microwave oven according to claim 1, wherein said means for rotating includes switch means for selectively activating and deactivating said rotating means.

11. A microwave oven according to claim 1, wherein said rotating means comprises means for selectively adjusting the speed of said rotating.

12. A microwave oven as in claim 1 wherein said disabling means includes switch means for controlling power to said microwave generating means, said switch means being closed when unbiased and having a trigger arm which operatively cooperates with said shafts to open said switch means when said receptacle means is disposed in said oven.

13. A microwave oven as in claim 1 wherein:
said receptacle means is metallic.

* * * * *